United States Patent
Jung

(10) Patent No.: US 8,994,699 B2
(45) Date of Patent: Mar. 31, 2015

(54) TOUCH INPUT DEVICE

(76) Inventor: Young Woo Jung, Gangwon-do (KR)

( * ) Notice: Subject to any disclaimer, the term of this patent is extended or adjusted under 35 U.S.C. 154(b) by 109 days.

(21) Appl. No.: 13/812,593

(22) PCT Filed: Jul. 26, 2011

(86) PCT No.: PCT/KR2011/005503
§ 371 (c)(1),
(2), (4) Date: Jan. 28, 2013

(87) PCT Pub. No.: WO2012/015222
PCT Pub. Date: Feb. 2, 2012

(65) Prior Publication Data
US 2013/0127793 A1 May 23, 2013

(30) Foreign Application Priority Data
Jul. 27, 2010 (KR) .................. 10-2010-0072169

(51) Int. Cl.
*G06F 3/0354* (2013.01)
(52) U.S. Cl.
CPC .................................. *G06F 3/03545* (2013.01)
USPC .......................................... 345/179; 345/173
(58) Field of Classification Search
CPC .................................................. G06F 3/03545
USPC ......................................................... 345/179
See application file for complete search history.

(56) References Cited

U.S. PATENT DOCUMENTS

| 5,488,204 A * | 1/1996 | Mead et al. ................. 178/18.06 |
| 6,147,681 A * | 11/2000 | Chery et al. ................... 345/179 |
| 6,667,740 B2 * | 12/2003 | Ely et al. ........................ 345/179 |
| 2003/0067453 A1 * | 4/2003 | Liu et al. ........................ 345/179 |
| 2007/0003168 A1 * | 1/2007 | Oliver ............................ 382/314 |
| 2012/0127088 A1 * | 5/2012 | Pance et al. .................... 345/173 |
| 2012/0228039 A1 * | 9/2012 | Hinson et al. .............. 178/19.03 |
| 2014/0192029 A1 * | 7/2014 | Heo ............................... 345/179 |

FOREIGN PATENT DOCUMENTS

| JP | 2008269244 | 11/2008 |
| JP | 2009251704 | 10/2009 |
| JP | 2010039610 | 2/2010 |
| KR | 20090017883 | 2/2009 |

* cited by examiner

*Primary Examiner* — Amare Mengistu
*Assistant Examiner* — Shawna Stepp Jones
(74) *Attorney, Agent, or Firm* — IPLA P.A.; James E. Bame

(57) ABSTRACT

A touch input device comprises: a body made of a conductive material; a brush formed at one end of the body for external extraction, and which is made of a conductive material for touching a capacitive touch panel; and a unit for generating a clicking sensation which is installed within the body to generate a clicking sensation when the touch panel is touched by the brush, thereby enabling a user to sense a click when touching the touch panel, thus improving user convenience, enabling dragging to be smoothly performed, enabling pictures to be easily drawn, minimizing damage such as scratches or the like on the surface of the touch panel, and enabling the surface of the touch panel to be cleaned.

8 Claims, 4 Drawing Sheets

TOUCH INPUT DEVICE

BACKGROUND OF THE INVENTION

The present invention relates to a touch input device for inputting information by touching a touch panel.

A personal computer, a portable transmission device, other personal information processing devices, etc. perform text processing, graphic processing, etc. by using a variety of input devices, such as a keyboard, a mouse, and a digitizer.

The input devices are input device as interfaces according to the expansion of PC use, and the products cannot be handled by using only a keyboard and a mouse. The input devices are being developed owing to the need in which the input devices are simple and less in a mal-operation and anyone can easily perform input and perform text input directly while carrying the input devices.

In particular, there has been known a touch panel which is simple and less in a mal-operation and which enables a user to perform a desired command by only touching a panel so that the user can perform input directly. There are various types of touch panels in the detection method, structure, performance, etc. of the touch panel. That is, the touch panel can be basically classified into a resistive film method, a capacitance method, a ultrasonic wave method, a light (infrared) sensor method, an electronic induction method, etc.

The resistive film method touch panel is the most frequently used touch panel and is also called a decompression method touch panel for sensing pressure. The resistive film method touch panel includes an upper and lower plate structure having two layer. When the touch panel is touched by applying pressure, the upper and lower plates are brought in contact with each other, electricity flows, and the electricity is sensed. The ultrasonic wave method touch panel, the light (infrared) sensor method touch panel, the electronic induction method touch panel, etc. are complicated and expensive, and they are not suitable for small-sized touch panel, but are limitedly used in fixed and large-scale panels.

Meanwhile, the capacitance method touch panel is also called an electrostatic or constant voltage method. The capacitance method touch panel is based on the fact that an electric field is formed when an electric current is made to flow on a surface of the panel. When an electric current is made to flow toward the center of a square panel from the four points of the square panel, the fact that the electric current becomes weak farther from the points is sensed and a location to be touched is sensed by measuring the sensed values.

In this touch panel input device, a user can input a command by touching the touch panel by using his finger. If a user's finger touches the touch panel, however, there are problems in that the touch panel is contaminated or damaged by a sharp nail, etc. and precise manipulation is difficult. A touch pen or a stylus pen is used as a touch input device for solving the problems.

In the resistive film method, a touch panel has only to be touched by applying pressure to the touch panel. The tip of a touch pen as a touch panel input device has only to be formed in the body having a common long shape. However, the capacitance method touch panel cannot use a resistive film method touch pen and must use a conductive touch pen that is able to be used only in a capacitance method touch panel.

A conventional capacitance method touch pen includes a touch tip made of a conductive material and provided at the end of a body 10.

The touch tip is made of a conductive rubber material or a conductive fiber material.

The touch tip has a cylindrical shape and inevitably has a large diameter. This is because a minimum cross area for sensing a change of capacitance between the touch tip and an electrode formed on the surface side of the panel is necessary. That is, if the touch tip has a small cross area, the sensing precision of a sensor must be increased. However, malfunction due to noise resulting from environmental factors, for example, moisture in the atmosphere, other external dielectric alien substances and an error due to a temperature drift are likely to occur, and power consumption for a sensing circuit is sharply increased. Accordingly, in order to sense a touch on the touch tip under sensing precision capable of excluding external noise, the touch tip inevitably has a large cross area. As a result, the size of the touch panel input device is inevitably increased. As described above, in order to increase the cross area, the contact area of the touch tip and the touch panel may be maximized by cutting the front end of the touch tip diagonally.

Furthermore, if a touch pen is used instead of a finger, the contamination of a touch panel and damage to the touch panel can be slightly reduced. If a task, such as a drag, is performed in the state in which a touch tip touches or has touched the touch panel, however, there are problems in that the touch panel is inevitably damaged and it is difficult to use the touch panel softly.

SUMMARY OF THE INVENTION

The present invention is for providing a touch input device which enables a drag task to be performed softly and enables a convenient drawing task.

Furthermore, the present invention is for providing a touch input device, which is capable of minimizing damage to a surface of a touch panel due to a scratch, etc. and performing a cleaning task on a surface of a touch panel.

Furthermore, the present invention is for providing a touch input device which has excellent touch performance, can improve durability, and enables a convenient touch task when it is touched at a specific tilt angle.

Furthermore, the present invention is for providing a touch input device in which a capacitance method and a resistive film method can be combined and used.

Furthermore, the present invention is for providing a touch input device which can be easily used so that a feeling of clicking can be provided when touching a touch panel by using a brush.

Furthermore, the present invention is for providing a touch input device having USB memory integrated therein.

Technical objects to be achieved by the present invention are not limited to the above-described objects and a person having ordinary skill in the art to which the present invention pertains can evidently appreciate other technical objects that have not been described above.

In an embodiment, a touch input device includes a body made of a conductive material, a brush disposed at the end of the body in such a way as to be externally drawn and made of a conductive material so that the brush touches a capacitance method touch panel, and a clicking feeling generation unit installed within the body and generating a feeling of clicking when the brush is brought in contact with the touch panel.

The clicking feeling generation unit includes a push rod disposed within the body movably in a straight line and having one end disposed in the brush, a dome member fixed to the body and generating a feeling of clicking that clunks when the dome member is pressed by the push rod, and a spring disposed within the body and giving elastic force to the push rod.

A slide member disposed within the body movably in a straight line and configured to have the brush fixed thereto and an elastic ring fixed to the end of the slide member, elastically surrounded by the outer circumferential surface of the brush, and contracted when the brush touches the touch panel are further included.

A slide member disposed within the body movably in a straight line and configured to have the brush fixed thereto, a protection ring disposed at the end of the slide member movably in a straight line, disposed in the outer surface of the brush, and leaded into the slide member when the brush is brought in contact with the touch panel, and an elastic member providing the protection ring with elastic force are further included.

The touch input device of the present invention is advantageous in that a drag task can be performed softly and a drawing action is convenient because it includes the brush made of a conductive material.

Furthermore, the touch input device of the present invention is advantageous in that damage due to a scratch, etc. can be minimized and a cleaning task can be performed on a surface of the touch panel because the brush softly touches a surface of the touch panel.

Furthermore, the touch input device of the present invention is advantageous in that it can have a wide range of use because a capacitance method and a resistive film method can be combined and used.

Furthermore, Furthermore, the touch input device of the present invention is advantageous in that a user can check whether or not there is a touch input and user convenience can be improved because it the clicking feeling generation unit generates a feeling of clicking when the brush touches the touch panel.

Furthermore, the touch input device of the present invention is advantageous in that the widening of the brush can be minimized and the generation of dust can be minimized according to an increase in the number of times of use because the brush is surrounded by the brush protection unit.

Furthermore, the touch input device of the present invention is advantageous in that a variety of tasks can be performed by controlling the contact area of the brush and the touch panel through the adjustment of the draw length of the brush.

Furthermore, the touch input device of the present invention is advantageous in that a function of storing data and touch input function can be performed at the same time because USB memory is integrated with the body.

DETAILED DESCRIPTION OF THE INVENTION

Hereinafter, embodiments in accordance with the present invention are described in detail with reference to the accompanying drawings. In this process, the sizes, shapes, etc. of elements shown in the figures may have been enlarged for the clarity of a description and for convenience' sake. Furthermore, terms specially defined by taking the constructions and functions of the present invention into consideration may vary depending on an intention of a user or an operator or usages. Accordingly, the terms should be defined based on the contents over the entire specification.

Figure 1:
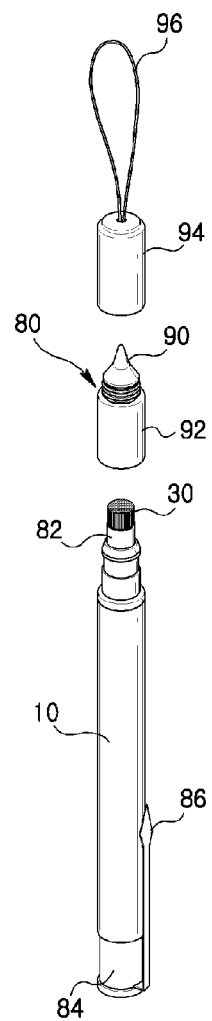
FIG. 1 is a perspective view showing a state in which a touch input device in accordance with an embodiment of the present invention has been separated.
Figure 2:
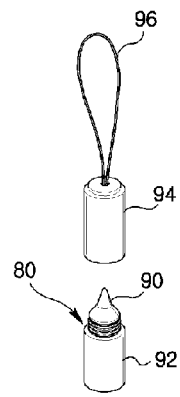
FIG. 2 shows a state in which the touch input device in accordance with an embodiment of the present invention operates.
Figure 2:
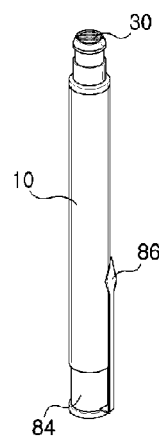

FIG. 1 is a perspective view showing a state in which a touch input device in accordance with an embodiment of the present invention has been separated, and FIG. 2 shows a state in which the touch input device in accordance with an embodiment of the present invention operates.

The touch input device in accordance with an embodiment of the present invention includes a body 10 held by the hand of a user, a brush 30 installed in the body 10 so that it can be externally drawn and configured to touch a capacitance method touch panel, a touch pen unit 80 detachably mounted on the body 10 and configured to have a pointed end so that the touch pen unit 80 can touch a resistive film method touch panel, and a brush draw unit installed in the body 10 and configured to draw the brush 30 outside the body 10 or lead the body 10 therein.

The body 10 is formed in a cylindrical form having a diameter that is easy to grasp by the hand, and a slide member 20 is disposed in the body 10 in such a way as to slide thereon.

Here, the body 10 can have a variety of forms which are easy to graph by the hand and into which the design is taken into consideration, such as a polygonal form and a form having a curve on its external surface, in addition to a cylindrical form.

The body 10 is made of a conductive material. That is, in the case of the capacitance method, the body 10 is made of a conductive material so that static electricity generated from the body can be transferred to a touch panel when a user grasps the body by the hand and touches the touch panel. The body 10 can be made of a metal material having conductivity and can be made of a conductive fiber material, and any material having conductivity can be used as the body 10.

The slide member 20 is formed to have the same cross section as the body 10 and is smaller in size than the body 10. The slide member 20 is drawn from and led into the body 10. Furthermore, a latch unit is formed between the slide member 20 and the body, and the latch unit prevents the slide member 20 from being led into the body 10 when the slide member 20 is drawn from the body 10 to a maximum extent and prevents the slide member 20 from being pulled out from the body 10.

The brush 30 is fixed to the end of the slide member 20 and made of several threads of conductive fiber. The conductive fiber refers to a mixture of fiber forming polymer and carbon black as a conductive component. For example, the fiber forming polymer can include polyester, nylon-6, nylon-6.6, polypropylene, etc. In particular, polyester having excellent texture, the easy handling of a processing process, and excellent chemical resistance properties, more preferably, polyethyleneterephthalate is preferred. In order to provide conductivity to the fiber forming polymer, carbon black, that is, a conductive part, is included in the fiber forming polymer. Carbon black can include, for example, acetylene black, oil furnace black, thermal black, channel black, Ketjenblack, and carbon nanotube. The carbon black can be commonly used by dispersing the carbon black in a matrix polymer. Here, the various types of fiber forming polymers are used as the matrix polymer.

The brush draw unit includes a press button 84 disposed at the end of the body 10 so that a pressing operation is possible and connected to the slide member 82. Furthermore, actuation components for performing an operation of drawing the brush 30 outside the body 10 or leading the brush 30 therein in response to the operation of the press button 84 are included in the body.

The brush draw unit draws the brush 30 outside the body 10 when the press button 84 is pressed once and leads the brush 30 into the body 10 when the press button 84 is pressed again. Furthermore, a sticking pin 86 by which the touch input device can be sticked into a pocket, etc. is installed in the press button 84.

The brush draw unit can have any structure in which the brush 30 can be lead into the body and drawn therefrom, in addition to the above-described press button 84 structure.

The touch pen unit 80 includes a cap unit 92 detachably coupled to the end of the body 10 and configured to protect the brush 30 and a tip unit 90 installed at the end of the cap unit 92 and configured to have a pointed shape so that the tip unit touches a resistive film method touch panel. Here, it is preferred that the tip unit 90 be made of resin material in order to minimize damage to a surface of a touch panel.

Next, a cap 94 for protecting the tip unit 90 is detachably mounted on the touch pen unit 80. A connection string 96 for connecting the touch input device to a display device having a touch panel is fixed to the cap 94.

If the touch input device constructed as described above in accordance with one embodiment is sought to be used in a capacitance method touch panel, when the touch pen unit 80 is separated from the body 10 and the press button 84 is pressed, the brush 30 is drawn outside the body 10 as shown in FIG. 1.

Next, when the press button 84 is pressed again, the brush 30 is led into the body 10 and is not externally exposed as shown in FIG. 2.

Figure 3:
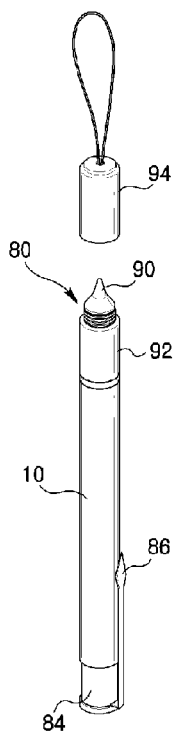
FIG. 3 is a perspective view showing another example in which touch input device in accordance with an embodiment of the present invention is used.

Furthermore, if the touch input device in accordance with one embodiment is sought to be used in a resistive film method touch panel, when the cap 94 is separated from the touch pen unit 80 as shown in FIG. 3, the tip unit 90 of the touch pen unit 80 is externally exposed, and the tip unit 90 touches the resistive film method touch panel.

The touch input device in accordance with one embodiment of the present invention can be used conveniently because it can be used both in a resistive film method and a capacitance method touch panel by using one touch input device.

Furthermore, there are advantages in that the brush can be protected because the brush is drawn outside the body only when he brush draw unit is included and used and the cap or the touch pen unit can be easily mounted on the body.

Figure 4:
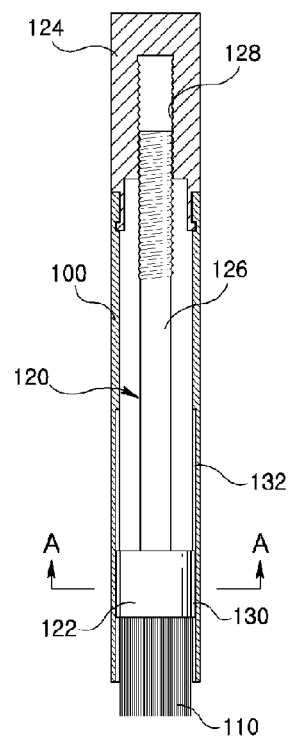
FIG. 4 is a cross-sectional view of the touch input device in accordance with a second embodiment of the present invention.

FIG. 4 is a cross-sectional view of a touch input device in accordance with a second embodiment of the present invention.

The touch input device in accordance with the second embodiment includes a body 100 grasped by the hand of a user, a brush 110 included in the body 100 and brought in contact with a capacitance method touch panel, and a brush length adjustment unit 120 included in the body 100 and configured to adjust the length of the brush 110 that is drawn.

The touch input device in accordance with the second embodiment can further include the brush draw unit and the touch pen unit capable of touching a resistive film method touch panel, which have been described in the one embodiment.

If a contact area where the brush 110 comes into contact with a touch panel can be adjusted, the thickness of a line can be easily adjusted when performing a drawing task and proper handling for the size of a touch panel is possible. That is, in a portable communication device, etc. including a touch panel having a relatively small size, a precise touch task can be performed by reducing a contact area between the brush and the touch panel. If the size of the touch panel is relatively large, touch performance is increased by increasing a contact area between the brush and the touch panel.

If the contact area of the touch panel of the brush 110 can be adjusted as described above, touch panel having various sizes can be used by using one touch input device and various types of touch tasks can be properly handled.

Accordingly, in the second embodiment, the brush length adjustment unit 120 is included. If the length of the brush that is drawn is short, a contact area between the brush and the touch panel can be made small. If the length of the brush that is drawn is long, a contact area between the brush and the touch panel can be made wide because the brush can be widely spread.

The brush length adjustment unit 120, for example, includes a moving member 122 configured to have the brush 110 fixed thereto and disposed within the body 100 so that it can be moved in a straight line, a rotating member 124 rotatably installed in the body 100, and driving units 126 and 128 configured to move the moving member 122 in a straight line when the rotating member 124 is rotated.

Figure 5:
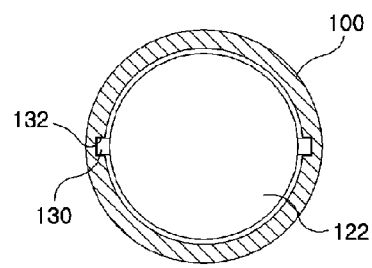
FIG. 5 is a cross-sectional view of line A-A in FIG. 4.

One or more latch projections 130 are formed in the outer circumferential surface of the moving member 122 so that the moving member 122 is moved within the body 100 in a straight line, but is not rotated as shown in FIG. 5. The latch projections 130 are inserted into latch grooves 132 formed in the inner surface of the body 100 in the length direction, thus preventing the moving member 122 from rotating.

The driving unit 126 includes a screw bar 126 connected to the moving member 122 and configured to have a male screw unit formed in its outer circumferential surface and a female screw unit 128 formed in the inner surface of the rotating member 124 and screwed onto the male screw unit of the screw bar 126.

The operation of the brush length adjustment unit 120 is described below. When the rotating member 124 is rotated in one direction, the screw bar 126 advances and draws the brush 110, fixed to the moving member 122, outside the body 100 so that the length of the brush 110 that is drawn becomes long. When the rotating member 124 is rotated in the other direction, the screw bar 126 recedes and leads the brush 110 into the body 100 so that the length of the brush 110 that is drawn becomes short.

Figure 6:
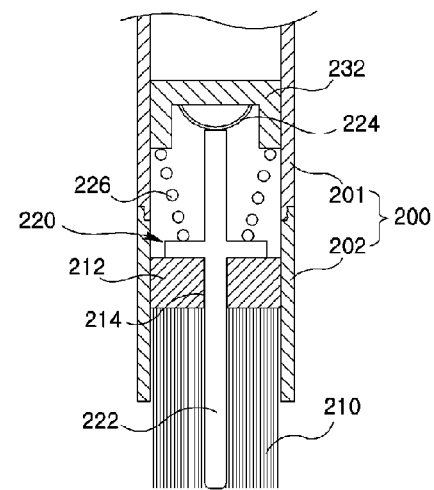
FIG. 6 is a cross-sectional view of a touch input device in accordance with a third embodiment of the present invention.
Figure 7:
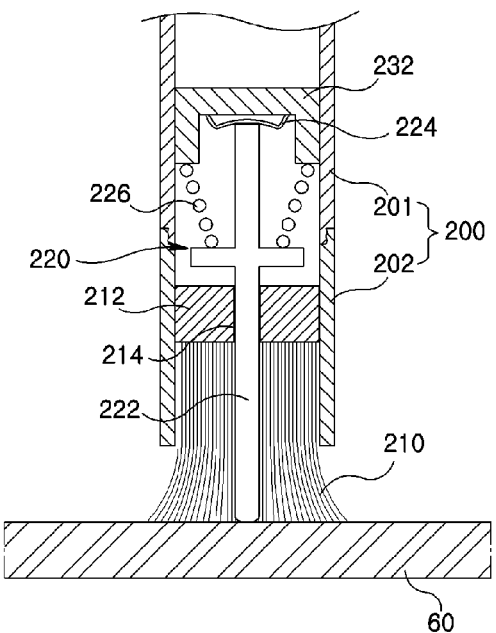
FIG. 7 shows a state in which the touch input device in accordance with the third embodiment of the present invention operates.

FIG. 6 is a cross-sectional view of a touch input device in accordance with a third embodiment of the present invention, and FIG. 7 shows a state in which the touch input device in accordance with the third embodiment of the present invention operates.

The touch input device in accordance with the third embodiment includes a body 200 grasped by the hand of a user, a brush 210 disposed at the end of the body 200, disposed in such a way as to be drawn externally, and configured to touch a capacitance method touch panel, and a clicking feeling generation unit 220 configured to generate a feeling of clicking so that a user can check whether the brush 210 has touched a touch panel 60 or not when the brush 210 touches the touch panel 60.

The touch input device may include only the body 200 configured to have a touch tip included at its end and the clicking feeling generation unit 200 configured to generate a feeling of clicking so that a user can check whether the body has touched the touch panel 60 or not when the body touches the touch panel 60. That is, the touch input device may be implemented without the brush 210. In this case, when a resistive film method touch panel is touched, a feeling of touch can be generated so that whether the touch tip has touched the touch panel or not can be checked.

The touch input device in accordance with the third embodiment can further include the brush draw unit and the touch pen unit capable of touching a resistive film method touch panel which have been described in the one embodiment.

In the case of a key pad, when a key button is pressed, information is inputted. In this case, a user can check whether the information has been inputted or not because there is a feeling of clicking that presses the key pad. In the case of a touch panel, however, since information is inputted to the touch panel when the touch panel is touched, a user cannot check whether or not there is a touch input because he cannot have a feeling of clicking.

Accordingly, the clicking feeling generation unit is included in the touch input device, with the result that when a touch input is performed, a user can have a feeling of clicking and thus information can be inputted precisely.

The body 200 is separated into a first body 201 grasped by the hand of a user and a second body 202 configured to have the brush 210 mounted thereon, and the first body 201 and the second body 202 are coupled detachably. The coupling structure of the first body and the second body is a screw coupling method in the present embodiment, but not limited thereto. A variety of methods capable of coupling the two bodies can be used. The bodies are made of a conductive material.

The brush 210 is disposed so that it is exposed to the outside of the second body 202 and fixed to the inner surface of the second body 202 by way of a fixing member 212. A through hole 214 is formed in the fixing member 212. The fixing member 212 is fixed to the inner surface of the second body 202 and is made of a conductive material so that electricity can conduct between the brush 210 and the second body 202.

The clicking feeling generation unit 220 includes a push rod 222 configured to have one side disposed in the center of the brush 210 and to penetrate the through hole 214, a dome member 224 fixed to the first body 201 and configured to generate a feeling of clicking that clunks when being pressed by the push rod 222, and a spring 226 disposed in the push rod 222 and configured to provide elastic force to the push rod 222.

The push rod 222 includes a stopper 230 engaged with the fixing member 212 and configured to prevent the push rod 222 form being deviated wherefrom. One side of the push rod 222 is disposed in the center of the brush 210 and brought in contact with the touch panel 60, and the other side of the push rod 222 is brought in contact with the dome member 224, thus pressing the dome member 224.

When the dome member 224 is fixed to a dome support member 232 fixed to the inner surface of the first body 201 and is pressed, the dome member 224 generates a feeling of clicking that clunks. The dome member 224 is formed of a thin metal plate having a dome shape.

The spring 226 has one end supported by the stopper 230 and the other end supported by the dome support member 232 and provides elastic force to the push rod 222.

The operation of the touch input device constructed as described above in accordance with the third embodiment of the present invention is described below.

When a user brings the brush 210 in contact with the touch panel 60 while grasping the body 200 in order to input information, the push rod 222 disposed in the center of the brush 210 overcomes the elastic force of the spring 226 by means of force that presses the touch panel 60, so that the push rod 222 is pressed. In response thereto, the push rod 222 presses the dome member 224. When the dome member 224 is pressed, it generates a feeling of clicking that clunks. Accordingly, a user can have a feeling of clicking for a touch input conveniently.

Figure 8:
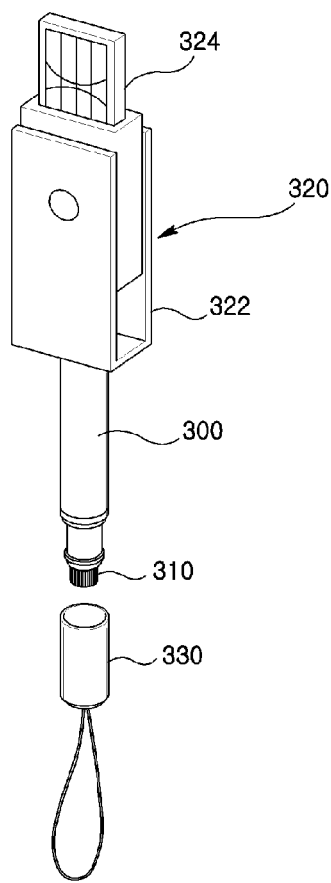
FIG. 8 is a perspective view of a touch input device in accordance with a fourth embodiment of the present invention.

FIG. 8 is a perspective view of a touch input device in accordance with a fourth embodiment of the present invention.

The touch input device in accordance with the fourth embodiment includes a body 300, a brush 310 fixed to the end of the body 300 and configured to touch a capacitance method touch panel, and USB memory 320 fixed to the body 300.

The body 300 can detachably include a cap 330 for protecting the brush 310.

The body 300 and the brush 310 can include at least one of the elements described in connection with all the embodiments.

The USB memory 320 includes a housing 322 connected to the body and a connector 324 installed in the housing 322 in such a way as to be drawn therefrom and configured to draw the housing 322 externally when the connector 324 is rotated in one direction.

The USB memory 320 can include a variety of structures, such as a structure in which the cap is mounted in such a way as to be separated from the connector and a structure in which the connector is disposed in the housing in such a way as to slide thereon, in addition to the above structure.

As described above, the touch input device in accordance with the fourth embodiment can be used conveniently and can have a variety of applications because it further includes the USB memory in the structure having the brush capable of touching a capacitance method touch panel.

The embodiments in accordance with the present invention have been described above, but they are only illustrative. A person having ordinary skill in the art will appreciate that a variety of modifications and embodiments having an equivalent range are possible from the aforementioned embodiments. Accordingly, the intrinsic technical scope of the present invention should be defined by the following claims.

REFERENCE NUMERALS SHOWN IN THE DRAWINGS 10, 100, 300: body 20, 82: slide member
22: space unit 30, 110, 210, 310: brush
32, 212: fixing member 40: cap member
42, 96: connection string 50: elastic ring
60: touch panel 70: protection ring
72: elastic member 74: latch unit
80: touch pen unit 84: press button
86: sticking pin 90: tip unit
92: cap unit 94, 330: cap
120: brush length adjustment unit 122: moving member
124: rotating member 126: screw bar
128: female screw unit 130: latch projections
132: latch grooves 200: body
201: first body 202: second body 214: through hole 220: clicking feeling generation unit
222: push rod 224: dome member
226: spring 230: stopper
232: dome support member 320: USB memory
322: housing 324: connector

The invention claimed is:

1. A touch input device, comprising:
a body;
a brush disposed at an end of the body in such a way as to be externally drawn and made of a conductive material so that the brush touches a capacitance method touch panel; and
a clicking feeling generation unit installed within the body and generating a feeling of clicking when the brush is brought in contact with the touch panel,
wherein the clicking feeling generation unit comprises:
a push rod disposed within the body movably in a straight line and having one end disposed in the brush;
a dome member fixed to the body and generating a feeling of clicking that clunks when the dome member is pressed by the push rod;
a spring disposed within the body and giving elastic force to the push rod, and
wherein the brush is planted in a fixing member fixed to an inner surface of the body,
a through hole through which the push rod passes is formed in the fixing member, and
a stopper engaged with the fixing member is formed in the push rod.

2. The touch input device according to claim 1, wherein the body comprises a press button for leading the brush into the body or drawing the brush outside the body.

3. The touch input device according to claim 1, wherein a cap for protecting the brush is mounted on the body so that the cap is opened or closed.

4. The touch input device according to claim 1, further comprising a touch pen unit detachably mounted on the body and configured to touch a resistive film method touch panel.

5. The touch input device according to claim 1, wherein the dome member is mounted on a dome support member fixed to the inner surface of the body and made of a thin metal pate.

6. The touch input device according to claim 1, further comprising USB memory mounted on one side of the body.

7. The touch input device according to claim 6, wherein:
a housing is connected to the one side of the body, and
the USB memory is mounted on the housing in such a way to be drawn from the housing.

8. The touch input device according to claim 1, wherein the body is made of a conductive material.

\* \* \* \* \*